(12) United States Patent
Lee (10) Patent No.: US 11,506,822 B2
(45) Date of Patent: Nov. 22, 2022

(54) OPTICAL DEVICE

(71) Applicant: HYUNDAI MOBIS CO., LTD., Seoul (KR)

(72) Inventor: Hyun Soo Lee, Yongin-si (KR)

(73) Assignee: Hyundai Mobis Co., Ltd., Seoul (KR)

( * ) Notice: Subject to any disclaimer, the term of this patent is extended or adjusted under 35 U.S.C. 154(b) by 495 days.

(21) Appl. No.: 16/653,354

(22) Filed: Oct. 15, 2019

(65) Prior Publication Data

US 2020/0116903 A1 Apr. 16, 2020

(30) Foreign Application Priority Data

Oct. 15, 2018 (KR) ........................ 10-2018-0122263

(51) Int. Cl.
*G02B 3/04* (2006.01)
*G02B 3/00* (2006.01)
(Continued)

(52) U.S. Cl.
CPC ............... *G02B 3/04* (2013.01); *F21S 41/143* (2018.01); *F21S 41/20* (2018.01); *F21S 41/265* (2018.01); *F21V 5/04* (2013.01); *F21V 5/045* (2013.01); *F21Y 2115/10* (2016.08); *G02B 3/005* (2013.01); *G02B 3/0025* (2013.01);
(Continued)

(58) Field of Classification Search
CPC ........ G02B 3/04; G02B 19/0014; G02B 3/08; G02B 19/0066; G02B 13/18; G02B 3/02; G02B 27/0966; G02B 3/0068; G02B 3/005; G02B 27/30; G02B 3/0025; G02B 3/0075; G02B 27/0961; G02B 3/0031; G02B 27/0955; G03B 15/05; F21V 5/04;
(Continued)

(56) References Cited

U.S. PATENT DOCUMENTS 4,656,562 A * 4/1987 Sugino ............... G02B 27/0927
362/235
5,894,196 A * 4/1999 McDermott ............ H01L 33/54
362/311.12
(Continued)

FOREIGN PATENT DOCUMENTS

CN 104838201 8/2015
EP 1 686 309 A1 * 8/2006
(Continued)

OTHER PUBLICATIONS

Office Action dated Nov. 4, 2020 for Japanese Patent Application No. 2019-183553.

*Primary Examiner* — Evelyn A Lester
(74) *Attorney, Agent, or Firm* — H.C. Park & Associates, PLC (57) ABSTRACT

The optical device includes: a beam radiation unit configured to radiate light; a first aspheric lens unit including a first focal point, the first aspheric lens positioned on a light output side of the beam radiation unit such that the first focal point is formed at a light output surface of the beam radiation unit on the light output side of the beam radiation unit; and second aspheric lens units including second focal points, the second aspheric lens units positioned on the light output side of the beam radiation unit such that the second focal points are formed to overlap the first focus at the light output surface of the beam radiation unit.

13 Claims, 6 Drawing Sheets

(51) Int. Cl.
| | |
|---|---|
| G03B 15/05 | (2021.01) |
| G02B 19/00 | (2006.01) |
| F21V 5/04 | (2006.01) |
| G02B 27/30 | (2006.01) |
| G02B 13/18 | (2006.01) |
| G02B 3/08 | (2006.01) |
| F21S 41/20 | (2018.01) |
| G02B 27/09 | (2006.01) |
| G02B 3/02 | (2006.01) |
| F21Y 115/10 | (2016.01) |
| F21S 41/143 | (2018.01) |
| F21S 41/265 | (2018.01) |

(52) U.S. Cl.
CPC .......... *G02B 3/0031* (2013.01); *G02B 3/0068* (2013.01); *G02B 3/0075* (2013.01); *G02B 3/02* (2013.01); *G02B 3/08* (2013.01); *G02B 13/18* (2013.01); *G02B 19/0014* (2013.01); *G02B 19/0066* (2013.01); *G02B 27/0955* (2013.01); *G02B 27/0961* (2013.01); *G02B 27/0966* (2013.01); *G02B 27/30* (2013.01); *G03B 15/05* (2013.01)

(58) Field of Classification Search
CPC ..... F21V 5/045; F21Y 2115/10; F21S 41/143; F21S 41/20; F21S 41/265
USPC ................ 359/710, 711, 724, 798–800, 809; 362/235, 244, 311.01, 311.07, 317, 326, 362/331, 332, 555
See application file for complete search history.

(56) References Cited

U.S. PATENT DOCUMENTS

| | | | | |
|---|---|---|---|---|
| 5,898,267 | A * | 4/1999 | McDermott | F21V 7/0091 362/311.12 |
| 7,448,783 | B2 * | 11/2008 | Ohkawa | H01L 33/58 362/555 |
| 7,580,192 | B1 * | 8/2009 | Chu | F21V 7/0091 362/317 |
| 8,070,326 | B2 * | 12/2011 | Lee | F21V 5/08 362/326 |
| 2008/0037116 | A1 * | 2/2008 | Alasaarela | G02B 19/0061 359/711 |
| 2008/0291683 | A1 * | 11/2008 | Chinniah | G02B 19/0061 362/326 |
| 2009/0279296 | A1 | 11/2009 | Chang | |
| 2015/0300589 | A1 | 10/2015 | Iwasaki | |

FOREIGN PATENT DOCUMENTS

| | | |
|---|---|---|
| JP | H01-123209 | 5/1989 |
| JP | 2006-210295 | 8/2006 |
| JP | 2013-214449 | 10/2013 |
| JP | 2014-107052 | 6/2014 |
| KR | 10-2013-0106105 | 9/2013 |
| KR | 10-2015-0116607 | 10/2015 |

* cited by examiner

| L1 / Di | 60mm | 65mm | 70mm | 75mm | 80mm |
|---|---|---|---|---|---|
| 30mm | 25.8mm | 29.1mm | 32.6mm | 36.3mm | 40mm |
| 35mm | 23.4mm | 26.5mm | 29.7mm | 33.1mm | 36.6mm |
| 40mm | 21.4mm | 24.3mm | 27.3mm | 30.1mm | 33.7mm |
| 45mm | 19.8mm | 22.4mm | 25.2mm | 28.1mm | 31.2mm |
| 50mm | 18.4mm | 20.1mm | 23.5mm | 26.2mm | 29.1mm |

FIG. 6

OPTICAL DEVICE

CROSS-REFERENCE TO RELATED APPLICATION

This application claims priority from and the benefit of Korean Patent Application No. 10-2018-0122263, filed on Oct. 15, 2018, which is hereby incorporated by reference for all purposes as if set forth herein.

BACKGROUND

Field

Exemplary embodiments relate to an optical device, and more particularly, to an optical device capable of improving the degree of freedom of design and light efficiency and reducing the number of parts.

Discussion of the Background

In general, a projection optical system is configured using a single aspheric lens. The single aspheric lens has one focal distance.

Recently, a horizontal slim type optical system is configured using a plurality of horizontal slim lens having a horizontal length longer than a vertical length.

However, in the conventional technology, the degree of freedom of design and light efficiency may be degraded because the plurality of horizontal slim lens is used. Furthermore, the number of parts and the manufacturing cost of the optical system may be increased. Accordingly, there is a need to improve the problems.

The background art of the present disclosure is disclosed in Korean Patent Application Publication No. 2013-0106105 (Sep. 27, 2013, entitled "Lamp Apparatus for an Automobile").

The above information disclosed in this Background section is only for enhancement of understanding of the background of the invention and, therefore, it may contain information that does not constitute prior art.

SUMMARY

Exemplary embodiments of the present invention are directed to the provision of an optical device capable of improving the degree of freedom of design and light efficiency and reducing the number of parts.

Additional features of the inventive concepts will be set forth in the description which follows, and in part will be apparent from the description, or may be learned by practice of the inventive concepts.

According to one or more embodiments of the invention, an optical device includes: a beam radiation unit configured to radiate light; a first aspheric lens unit including a first focal point, the first aspheric lens positioned on a light output side of the beam radiation unit such that the first focal point is formed at a light output surface of the beam radiation unit on the light output side of the beam radiation unit; and second aspheric lens units including second focal points, the second aspheric lens units positioned on the light output side of the beam radiation unit such that the second focal points are formed to overlap the first focus at the light output surface of the beam radiation unit.

A first focal distance of the first aspheric lens unit and a second focal distance of the second aspheric lens unit may be differently formed.

The second focal distance of the second aspheric lens unit may be longer than the first focal distance of the first aspheric lens unit.

A distance between the first aspheric lens unit and the second aspheric lens unit may equal $$\frac{b(f_2 - f_1)}{f_1},$$

f1 representing the first focal distance of the first aspheric lens unit, f2 representing the second focal distance of the second aspheric lens unit, and b representing half of a width of the first aspheric lens unit.

The second aspheric lens units may be positioned on respective sides of the first aspheric lens unit.

The second aspheric lens units may be symmetrically formed on respective sides of a main light axis.

A first spherical part of the first aspheric lens unit may be formed on a side facing the beam radiation unit, and a first plane part of the first aspheric lens unit may be formed on a side opposite to the beam radiation unit.

A second spherical part of the second aspheric lens unit may be formed on a side facing the beam radiation unit, and a second plane part of the second aspheric lens unit may be formed on a side opposite to the beam radiation unit.

The first aspheric lens unit may have a vertical length longer than a horizontal length.

The vertical length of the first aspheric lens unit may be equal to or greater than three times the horizontal length of the first aspheric lens unit.

The second aspheric lens unit may have a vertical length longer than a horizontal length.

The vertical length of the second aspheric lens unit may be equal to or greater than three times the horizontal length of the second aspheric lens unit.

The beam radiation unit may include an LED.

The beam radiation unit may include an LED configured to radiate light and an optic unit configured to transmit light radiated from the LED, and the first focus and the second focus may overlap with the optic unit.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention, and together with the description serve to explain the principles of the invention.

DETAILED DESCRIPTION OF THE ILLUSTRATED EMBODIMENTS

The invention is described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure is thorough, and will fully convey the scope of the invention to those skilled in the art. Like reference numerals in the drawings denote like elements.

Various advantages and features of the present invention and methods accomplishing thereof will become apparent from the following description of embodiments with reference to the accompanying drawings. However, the present invention is not be limited to the embodiments set forth herein but may be implemented in many different forms. The present embodiments may be provided so that the disclosure of the present invention will be complete, and will fully convey the scope of the invention to those skilled in the art and therefore the present invention will be defined within the scope of claims. Like reference numerals throughout the description denote like elements.

Unless defined otherwise, it is to be understood that all the terms (including technical and scientific terms) used in the specification has the same meaning as those that are understood by those who skilled in the art. Further, the terms defined by the dictionary generally used should not be ideally or excessively formally defined unless clearly defined specifically. It will be understood that for purposes of this disclosure, "at least one of X, Y, and Z" can be construed as X only, Y only, Z only, or any combination of two or more items X, Y, and Z (e.g., XYZ, XYY, YZ, ZZ). Unless particularly described to the contrary, the term "comprise", "configure", "have", or the like, which are described herein, will be understood to imply the inclusion of the stated components, and therefore should be construed as including other components, and not the exclusion of any other elements.

Hereinafter, exemplary embodiments of the present invention will be described in more detail with reference to the accompanying drawings.

Figure 1:
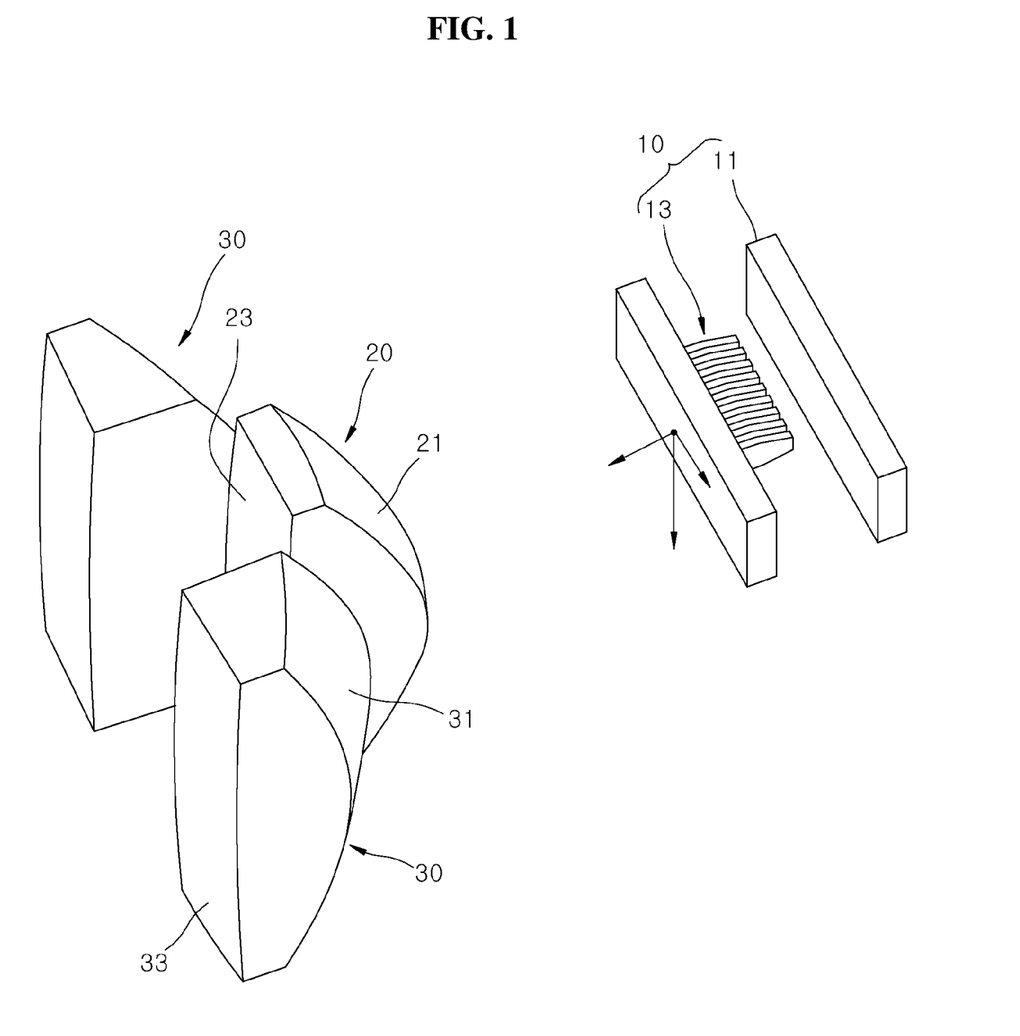
FIG. 1 is a perspective view of an optical device according to an embodiment of the present disclosure.
Figure 2:
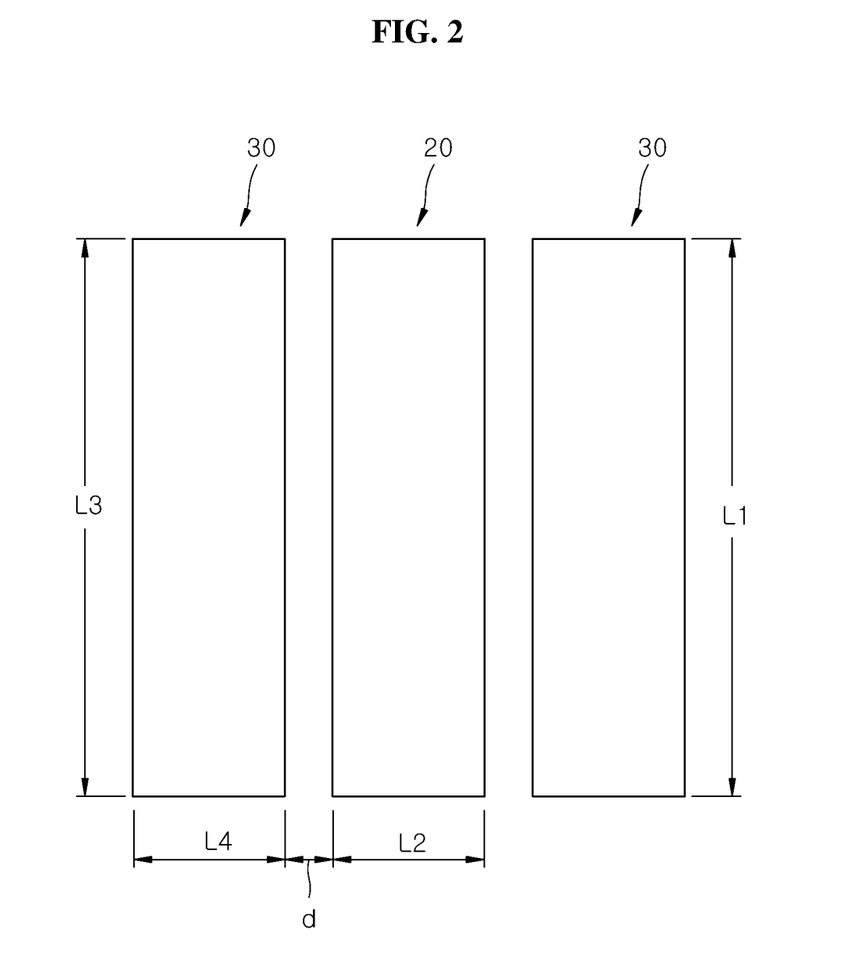
FIG. 2 is a front view showing a first aspheric lens unit and a second aspheric lens unit of the optical device according to an embodiment of the present disclosure.
Figure 3:
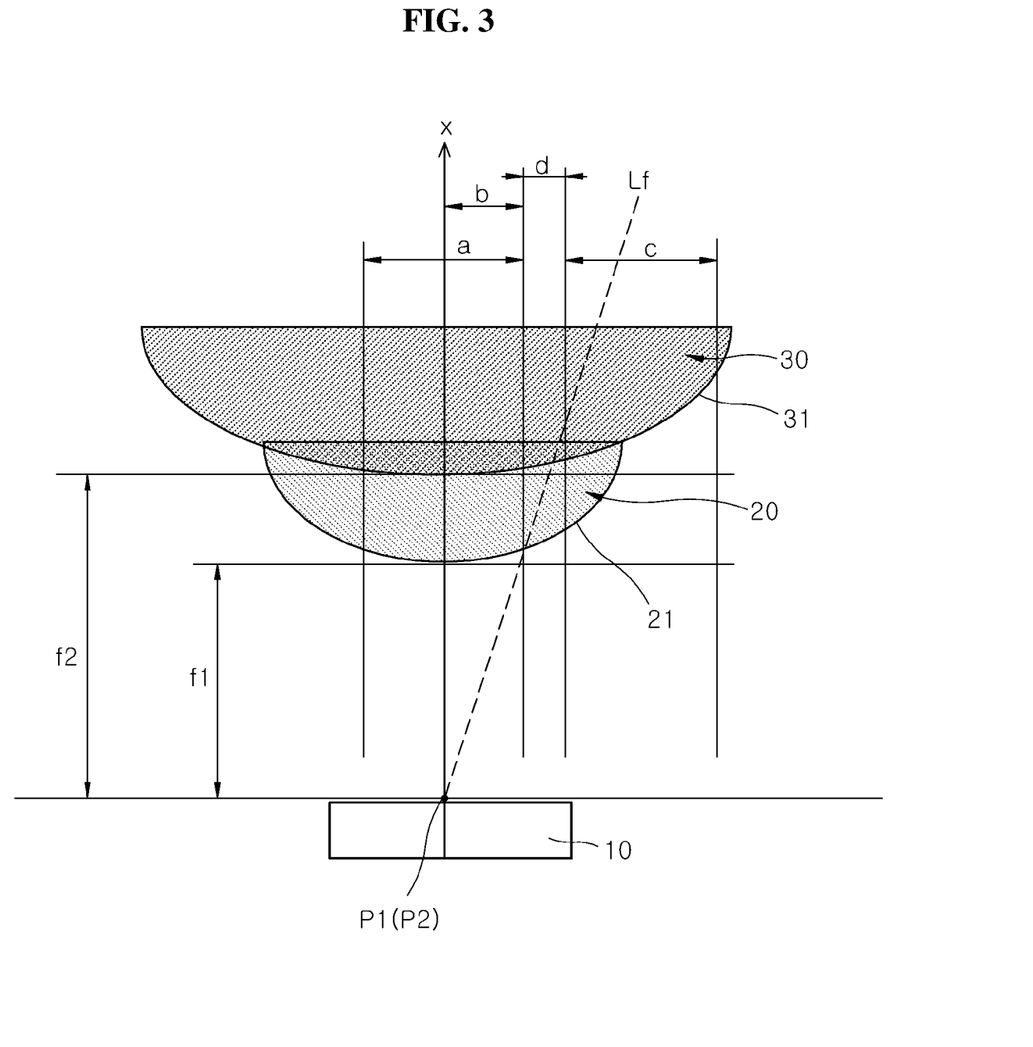
FIG. 3 is a diagram showing design factors of the first aspheric lens unit and the second aspheric lens unit in the optical device according to an embodiment of the present disclosure.
Figure 4:
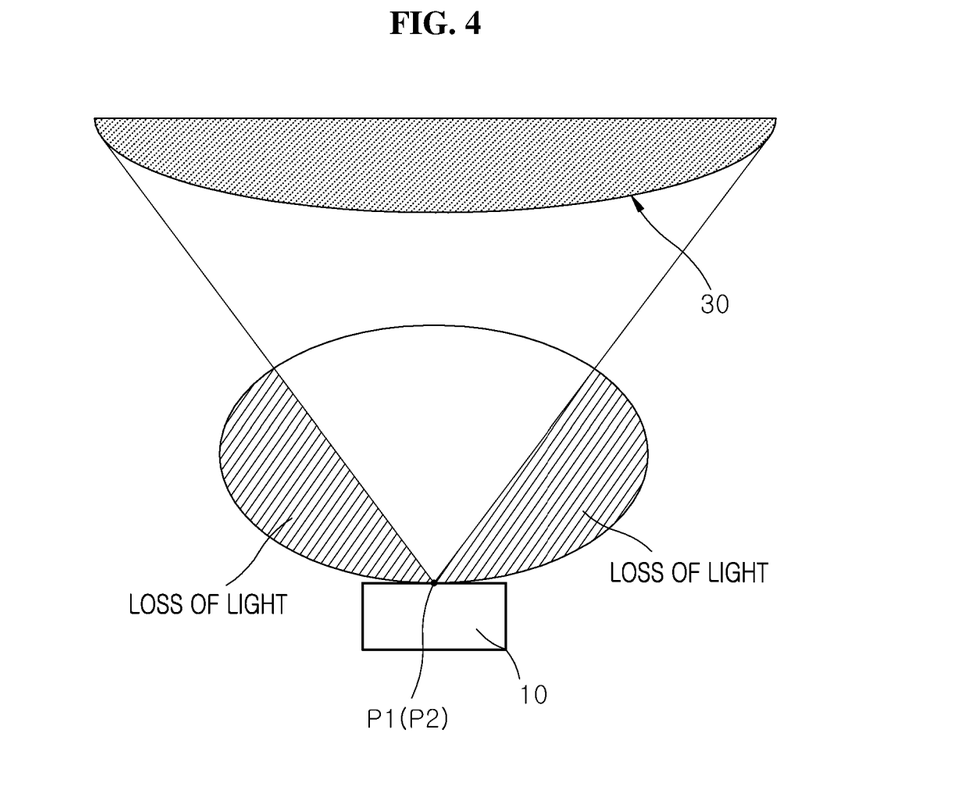
FIG. 4 is a diagram schematically showing the principle of a loss of light in the optical device according to an embodiment of the present disclosure.

FIG. 1 is a perspective view of an optical device according to an embodiment of the present disclosure. FIG. 2 is a front view showing a first aspheric lens unit and a second aspheric lens unit of the optical device according to an embodiment of the present disclosure. FIG. 3 is a diagram showing design factors of the first aspheric lens unit and the second aspheric lens unit in the optical device according to an embodiment of the present disclosure. FIG. 4 is a diagram schematically showing the principle of a loss of light in the optical device according to an embodiment of the present disclosure.

Referring to FIGS. 1 to 4, the optical device according to an embodiment of the present disclosure includes a beam radiation unit 10, a first aspheric lens unit 20 and second aspheric lens units 30.

The beam radiation unit 10 radiates light. The beam radiation unit 10 may be an LED 11. Furthermore, the beam radiation unit 10 may include the LED 11 for radiating light and an optic unit 13 which transmits light radiated by the LED 11 and in which a first focus P1 and a second focus P2 are formed to overlap each other. The optic unit 13 is made of a light-transparent material through which light can pass. The beam radiation unit 10 may be properly selected depending on the design or size of an optical device.

The first aspheric lens unit 20 is positioned on the light output side of the beam radiation unit 10, has a vertical length longer than a horizontal length (L1>L2), and forms the first focus P1 at the beam radiation unit 10. In the first aspheric lens unit 20, a first spherical part 21 may be formed on the side close to the beam radiation unit 10, and a first plane part 23 may be formed on the side opposite the beam radiation unit 10. The first aspheric lens unit 20 is a first vertical slim aspheric lens longer in a vertical direction than in a horizontal direction.

The second aspheric lens unit 30 is positioned on the light output side of the beam radiation unit 10, has a vertical length longer than a horizontal length (L3>L4), and forms the second focus P2 at the beam radiation unit 10 so that the second focus P2 overlaps the first focus P1. In the second aspheric lens unit 30, a second spherical part 31 may be formed on the side close to the beam radiation unit 10, and a second plane part 33 may be formed on the side opposite the beam radiation unit 10. The first focus P1 and the second focus P2 are formed to overlap each other at the beam radiation unit 10. Accordingly, light intensity can be increased because a loss of light output to the first aspheric lens unit 20 and the second aspheric lens units 30 is reduced.

The second aspheric lens units 30 are positioned on both sides of the first aspheric lens unit 20. Accordingly, light having uniform intensity can be output through the second aspheric lens units 30 on both sides of the first aspheric lens unit 20.

A first focal distance f1 of the first aspheric lens unit 20 and a second focal distance f2 of the second aspheric lens unit 30 are differently formed. For example, the second focal distance f2 of the second aspheric lens unit 30 may be formed longer than the first focal distance f1 of the first aspheric lens unit 20. Furthermore, the first focal distance f1 of the first aspheric lens unit 20 may be formed longer than the second focal distance f2 of the second aspheric lens unit 30. In this case, the first focal distance f1 of the first aspheric lens unit 20 is defined as the shortest distance between the central part of the first spherical part 21 and the beam radiation unit 10. The second focal distance f2 of the second aspheric lens unit 30 is defined as the shortest distance between the central part of the second spherical part 31 and the beam radiation unit 10.

The second spherical part 31 of the second aspheric lens unit 30 is positioned farther than the first spherical part 21 of the first aspheric lens unit 20 from the beam radiation unit 10.

The second aspheric lens units 30 are symmetrically disposed on both sides of a main light axis "x." In this case, the second spherical parts 31 are formed in a symmetrical form on the basis of the main light axis "x." That is, the second aspheric lens units 30 are formed in a rotation symmetry form on the basis of the main light axis "x."

The distance between the first aspheric lens unit 20 and the second aspheric lens unit 30 may be defined as follows.

The first focal distance of the first aspheric lens unit 20 is defined as $f_1$, half (a/2) of the width "a" of the first aspheric lens unit 20 is defined as "b", the second focal distance of the second aspheric lens unit 30 is defined as $f_2$, and the distance between the first aspheric lens unit 20 and the second aspheric lens unit 30 is defined as "d."

In this case, the relation between an extension line Lf connecting the end and focus of the second aspheric lens unit 30 and the focus is $$\frac{b+d}{f_1} = \frac{b}{f_1}$$

according to a right triangle formula. Accordingly, the distance "d" between the first aspheric lens unit 20 and the second aspheric lens unit 30 is $$d = \frac{b(f_2 - f_1)}{f_1}.$$

If the first aspheric lens unit 20 and the second aspheric lens unit 30 are set according to the above equation, an optical device may be standardized according to the equation. Accordingly, the design of the optical device can be facilitated and the design time can be reduced.

The first aspheric lens unit 20 has the vertical length L1 three times or more longer than the horizontal length L2. Furthermore, the second aspheric lens unit 30 has the vertical length L3 three times or more longer than the horizontal length L4.

An example of the optical device configured as described above according to an embodiment of the present disclosure will be described below.

Figure 5:
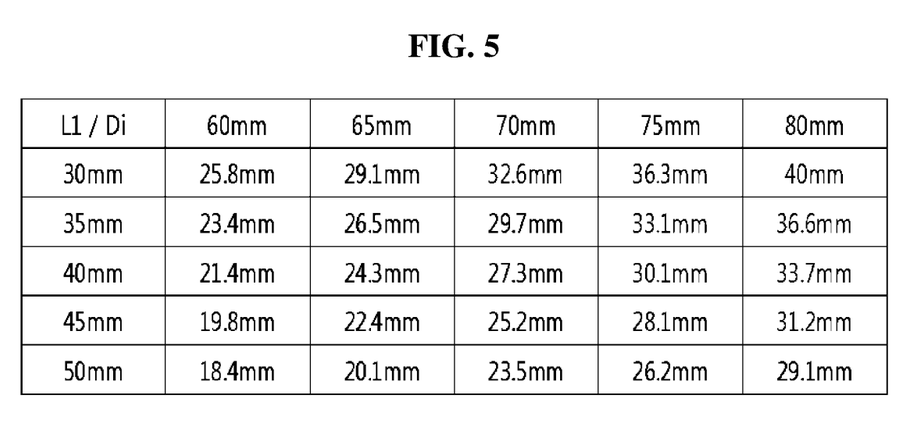
FIG. 5 is a table showing the relation between the thickness of the aspheric lens unit and a focal distance in the optical device according to an embodiment of the present disclosure.
Figure 6:
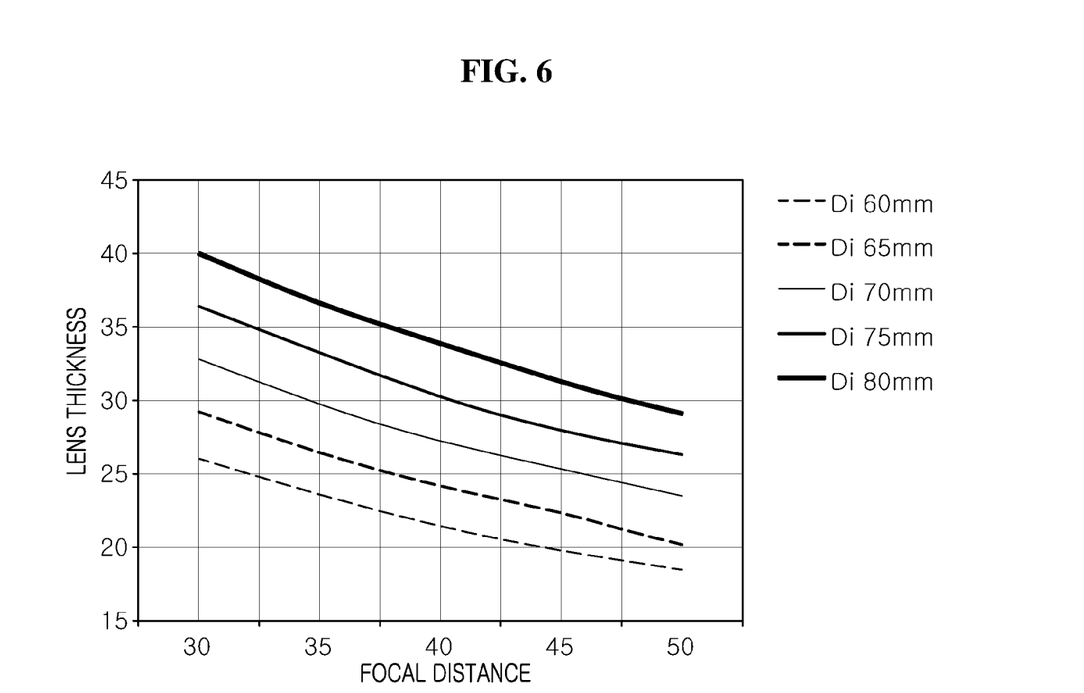
FIG. 6 is a graph showing the relation between a focal distance and a lens thickness in the optical device according to an embodiment of the present disclosure.

FIG. 5 is a table showing the relation between the thickness of the aspheric lens unit and a focal distance in the optical device according to an embodiment of the present disclosure. FIG. 6 is a graph showing the relation between a focal distance and a lens thickness in the optical device according to an embodiment of the present disclosure.

Referring to FIGS. 5 to 6, each of the first aspheric lens unit 20 and the second aspheric lens unit 30 has a vertical length three times or more longer than a horizontal length. In this case, if two aspheric lens units 20 and 30 having a common focus are applied to one module, the focal distance $f_1$ or $f_2$ of the aspheric lens unit 20 or 30 is reduced as the thickness of the aspheric lens unit 20 or 30 increases. Furthermore, the thickness of the aspheric lens unit 20 or 30 is reduced as the refractive index of the aspheric lens unit 20 or 30 increases.

When a minimum focal distance $f_1$ of the first aspheric lens unit 20 is set to 35 mm, the first aspheric lens unit 20 having a thickness of 70 mm or more is applied. The second aspheric lens unit 30 secures a minimum focal distance $f_2$ of 50 mm because it requires a thickness of 80 mm or more (refer to FIG. 6).

In this case, a one-side incident angle of the first aspheric lens unit 20 is about 15.9°, and a one-side incident angle of the second aspheric lens unit 30 is about 38.6°. It can be seen that light efficiency of the optical device can be compensated for because the one-side incident angle of 38° is formed if the thickness of the general first aspheric lens unit 20 is 70 mm. In this case, the one-side incident angle means an angle when light is incident from the lens unit to the main light axis "x" and one end (i.e., half the width direction) of the lens unit.

A known vertical slim optical system has center light intensity of about 35,000 cd and light efficiency of about 20%. In contrast, the optical device according to an embodiment of the present disclosure has center light intensity of about 60,000 cd and light efficiency of about 31%. Light efficiency of the optical device according to an embodiment of the present disclosure is about 50% higher than that of the conventional optical system. Accordingly, the number of LEDs 11 can be reduced as light efficiency is improved.

As described above, the first focus P1 and the second focus P2 are formed to overlap each other at the beam radiation unit 10. Accordingly, light intensity can be increased because a loss of light incident on the first aspheric lens unit 20 and the second aspheric lens unit 30 is reduced. Furthermore, the number of LEDs can be reduced as light intensity increases.

Furthermore, the range of light intensity which may be implemented in a single optical device can be expanded because the first focal distance f1 of the first aspheric lens unit 20 and the second focal distance f2 of the second aspheric lens unit 30 are differently formed. Accordingly, the degree of freedom of design can be improved.

According to an embodiment of the present disclosure, the first focus and the second focus are formed to overlap each other at the beam radiation unit. Accordingly, light intensity can be increased because a loss of light incident on the first aspheric lens unit and the second aspheric lens unit is reduced. Furthermore, the number of LEDs can be reduced as light intensity increases.

Furthermore, according to an embodiment of the present disclosure, the range of light intensity which may be implemented in a single optical device can be expanded because the first focal distance of the first aspheric lens unit and the second focal distance of the second aspheric lens unit are differently formed. Accordingly, the degree of freedom of design can be improved.

Although preferred embodiments of the present disclosure have been disclosed for illustrative purposes, those skilled in the art will appreciate that various modifications, additions and substitutions are possible, without departing from the scope and spirit of the present disclosure as defined in the accompanying claims.

Thus, the true technical scope of the present disclosure should be defined by the following claims.

What is claimed is:

1. An optical device, comprising:
   a beam radiation unit configured to radiate light;
   a first aspheric lens unit comprising a first focal point, the first aspheric lens unit positioned on a light output side of the beam radiation unit such that the first focal point is formed at a light output surface of the beam radiation unit on the light output side of the beam radiation unit; and
   a second aspheric lens unit comprising a second focal point, the second aspheric lens unit positioned on the light output side of the beam radiation unit such that the second focal point is formed to overlap the first focal point at the light output surface of the beam radiation unit, wherein:
   a first spherical part of the first aspheric lens unit is formed on a side facing the beam radiation unit, and
   a first plane part of the first aspheric lens unit is formed on a side opposite to the beam radiation unit.

2. The optical device of claim 1, wherein a first focal distance of the first aspheric lens unit and a second focal distance of the second aspheric lens unit are differently formed.

3. The optical device of claim 2, wherein the second focal distance of the second aspheric lens unit is longer than the first focal distance of the first aspheric lens unit.

4. The optical device of claim 3, wherein a distance between the first aspheric lens unit and the second aspheric lens unit equals $$\frac{b(f_2 - f_1)}{f_1},$$

f1 representing the first focal distance of the first aspheric lens unit, f2 representing the second focal distance of the second aspheric lens unit, and b representing half of a width of the first aspheric lens unit.

5. The optical device of claim 3, wherein:
the second aspheric lens unit includes a plurality of second aspheric lens units, and
the plurality of second aspheric lens units are positioned on respective sides of the first aspheric lens unit.

6. The optical device of claim 5, wherein the plurality of second aspheric lens units are symmetrically formed on respective sides of a main light axis.

7. The optical device of claim 1, wherein:
a second spherical part of the second aspheric lens unit is formed on a side facing the beam radiation unit, and
a second plane part of the second aspheric lens unit is formed on a side opposite to the beam radiation unit.

8. The optical device of claim 1, wherein the first aspheric lens unit has a vertical length longer than a horizontal length.

9. The optical device of claim 8, wherein the vertical length of the first aspheric lens unit is equal to or greater than three times the horizontal length of the first aspheric lens unit.

10. The optical device of claim 8, wherein the second aspheric lens unit has a vertical length longer than a horizontal length.

11. The optical device of claim 10, wherein the vertical length of the second aspheric lens unit is equal to or greater than three times the horizontal length of the second aspheric lens unit.

12. The optical device of claim 1, wherein the beam radiation unit comprises an LED.

13. The optical device of claim 1, wherein the beam radiation unit comprises:
an LED configured to radiate light; and
an optic unit configured to transmit light radiated from the LED,
wherein the first focal point and the second focal point focus overlap with the optic unit.

* * * * *